(12) United States Patent
Kanai (10) Patent No.: US 8,755,079 B2
(45) Date of Patent: Jun. 17, 2014

(54) IMAGE FORMING APPARATUS DISCRIMINATING WHETHER IMAGE DATA OF AN OBJECT TO BE SUBJECTED TO TRANSFORMATION PROCESSING IS STORED IN A STORAGE UNIT

(75) Inventor: Yasunori Kanai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 13/435,553

(22) Filed: Mar. 30, 2012

(65) Prior Publication Data

US 2012/0262760 A1 Oct. 18, 2012

(30) Foreign Application Priority Data

Apr. 18, 2011 (JP) ................. 2011-091735

(51) Int. Cl.
*G06K 15/00* (2006.01)
(52) U.S. Cl.
USPC .......... 358/1.18; 358/1.9; 358/1.15; 358/3.28
(58) Field of Classification Search
None
See application file for complete search history.

(56) References Cited

U.S. PATENT DOCUMENTS

| | | | |
|---|---|---|---|
| 6,662,270 B1 * | 12/2003 | Sans et al. ................ | 711/118 |
| 6,919,967 B1 | 7/2005 | Pentecost et al. | |
| 7,280,258 B2 * | 10/2007 | Kitahara et al. ............ | 358/501 |
| 7,375,844 B2 * | 5/2008 | Kitahara et al. ............ | 358/1.6 |
| 8,270,036 B2 * | 9/2012 | Simske et al. ............. | 358/3.28 |
| 8,446,636 B2 * | 5/2013 | Yamazaki .................. | 358/1.9 |
| 8,526,036 B2 * | 9/2013 | Bellert et al. .............. | 358/1.15 |
| 2008/0013112 A1 * | 1/2008 | Yokoyama et al. ......... | 358/1.2 |
| 2010/0188709 A1 * | 7/2010 | Simske et al. ............. | 358/3.28 |

FOREIGN PATENT DOCUMENTS

| | | | |
|---|---|---|---|
| JP | 2001-199105 A | | 7/2001 |
| JP | 2010-044665 A | | 2/2010 |
| JP | 2011194742 A | * | 10/2011 |

* cited by examiner

*Primary Examiner* — Dung Tran
(74) *Attorney, Agent, or Firm* — Fitzpatrick, Cella, Harper & Scinto (57) ABSTRACT

In a case where a reusable object extracted from a print job and is subjected to transformation processing upon reuse thereof, a print device executes halftone processing taking into account the transformation indicated by the transformation processing for the reusable object, and generates image data to store the generated image data in a cache.

10 Claims, 8 Drawing Sheets

| DATA SIZE S [kbyte] | THE NUMBER OF TIMES OF USE (n) |
|---|---|
| 0 < SIZE ≦ 10 | 2 |
| 10 < SIZE ≦ 500 | 3 |
| 500 < SIZE ≦ 2000 | 6 |
| 2000 < SIZE | 12 |

IMAGE FORMING APPARATUS DISCRIMINATING WHETHER IMAGE DATA OF AN OBJECT TO BE SUBJECTED TO TRANSFORMATION PROCESSING IS STORED IN A STORAGE UNIT

BACKGROUND OF THE INVENTION

1. Field of the Invention

The present invention relates to an image forming apparatus, a method for controlling the same, and a storage medium.

2. Description of the Related Art

There have been proposed technologies called "Variable Data Printing: VDP" in which data for meeting a need for each customer is printed. For VDP in digital printing, standards such as PPML, PDF/VT, or the like (VDP language) have been developed, where PPML is an abbreviation for Personalized Print Markup Language, PDF is an abbreviation for Portable Document Format, and PDF/VT is a new standard PDF format for VDP.

In the VDP language, an object in print data may be classified into a reusable object, which is used a plurality of times, and a non-reusable object. An image forming apparatus for handling VDP caches rasterized image data of a reusable object. Cache processing is processing for storing (caching) image data in a storage unit such as a cache memory or the like and reusing image data in the storage unit without generating new image data when the same image is required. The image forming apparatus executes cache processing, and thus, the number of rasterizing times to be executed by the image forming apparatus decreases, resulting in an increase in the speed of print processing. Note that cached image data is described as "cache data".

Japanese Patent Laid-Open No. 2001-199105 discloses a variable data publishing print device that caches an image in a form used commonly across records to thereby repeatedly use the image for the records. Also, Japanese Patent Laid-Open No. 2010-044665 discloses an image processing device that performs cache processing for an image element(s) for which the effect of cache processing can be expected among image elements generated from the records.

There is a specification in which cache data after enlargement/reduction/rotation/movement (hereinafter referred to as "transformation") of cache data is reused by an image forming apparatus. The specification is a specification based on a VDP language. Here, image data cached in a storage unit may have already been subjected to halftone processing. In this case, if the image forming apparatus reuses cache data subjected to transformation, the halftone shape of cache data may be transformed, resulting in the occurrence of image failure.

SUMMARY OF THE INVENTION

The image forming apparatus of the present invention is an apparatus that reuses image data of a reusable object subjected to halftone processing and does not cause image failure even when image data is subjected to transformation processing upon reuse thereof.

The image forming apparatus of an aspect of the present invention includes a first discrimination unit configured to discriminate whether or not image data of an object to be subjected to transformation processing is stored in a storage unit, and a first acquisition unit configured to generate image data on which halftone processing taking into account transformation has been executed and store the generated image data in the storage unit in a case where the first discrimination unit has discriminated that image data of the object to be subjected to transformation processing is not stored in the storage unit, and acquire image data stored in the storage unit in a case where the first discrimination unit has discriminated that image data of the object to be subjected to transformation processing is stored in the storage unit.

Further features of the present invention will become apparent from the following description of exemplary embodiments with reference to the attached drawings.

DESCRIPTION OF THE EMBODIMENTS

Figure 1:
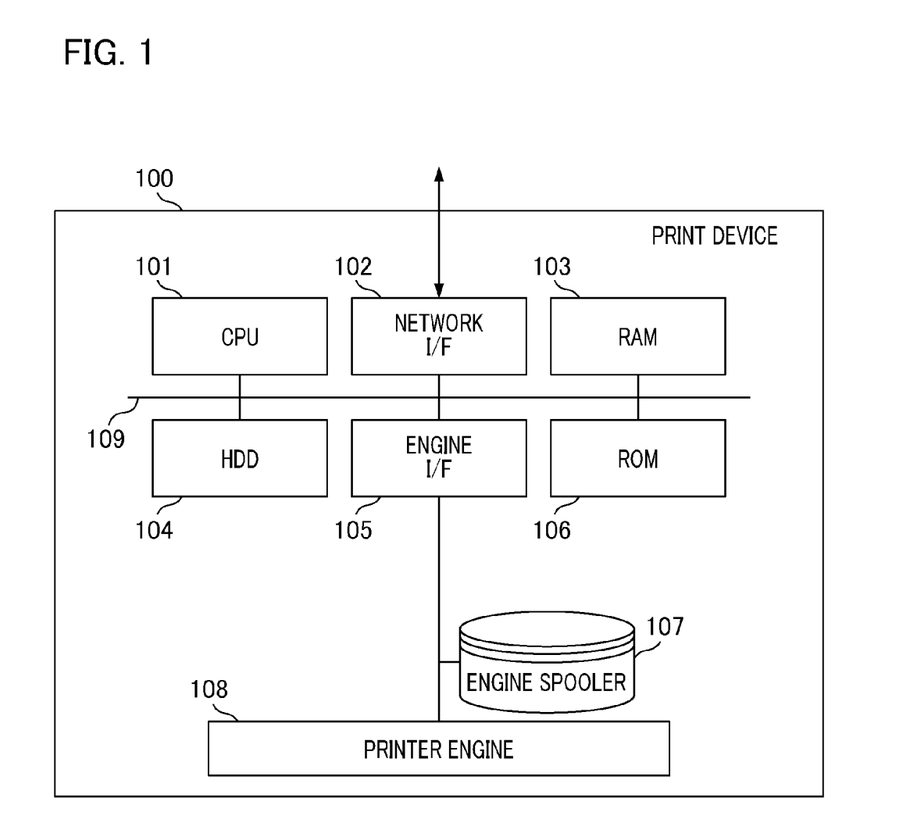
FIG. 1 is a diagram illustrating an example of the hardware configuration of the present embodiment.

FIG. 1 is a diagram illustrating an example of the hardware configuration of the present embodiment. A print device 100 shown in FIG. 1 is the image forming apparatus of the present embodiment. The print device 100 is, for example, a printer, a multi-function peripheral, or the like, and executes Variable Data Printing.

The print device 100 includes a CPU 101, a network I/F (Interface) 102, a RAM 103, an HDD 104, an engine I/F 105, a ROM 106, an engine spooler 107, and a printer engine 108, where CPU is an abbreviation for Central Processing Unit, RAM is an abbreviation for Random Access Memory, HDD is an abbreviation for Hard Disk Drive, and ROM is an abbreviation for Read Only Memory.

The CPU 101 is in charge of control of the units in the print device 100, computation, and execution of a program stored in a storage device via a system bus 109. The RAM 103 is used as a temporary storage area and a working memory upon operation of the print device 100. The HDD 104 is a large capacity storage device that stores various control programs to be executed by the CPU 101. The HDD 104 is also used as a temporary storage area for data to be processed. The ROM 106 stores an activation processing program for the print device 100 in advance.

A network I/F 102 communicates with an external device such as a host computer or the like via an external network. The engine I/F 105 is in charge of communication with and control of the printer engine 108. The printer engine 108 forms an image on the plane of a physical paper sheet using, for example, electrophotographic technology or inkjet image forming technology. The printer engine 108 includes the engine spooler 107. The engine spooler 107 temporarily stores page data transferred from the engine I/F 105.

Figure 2:
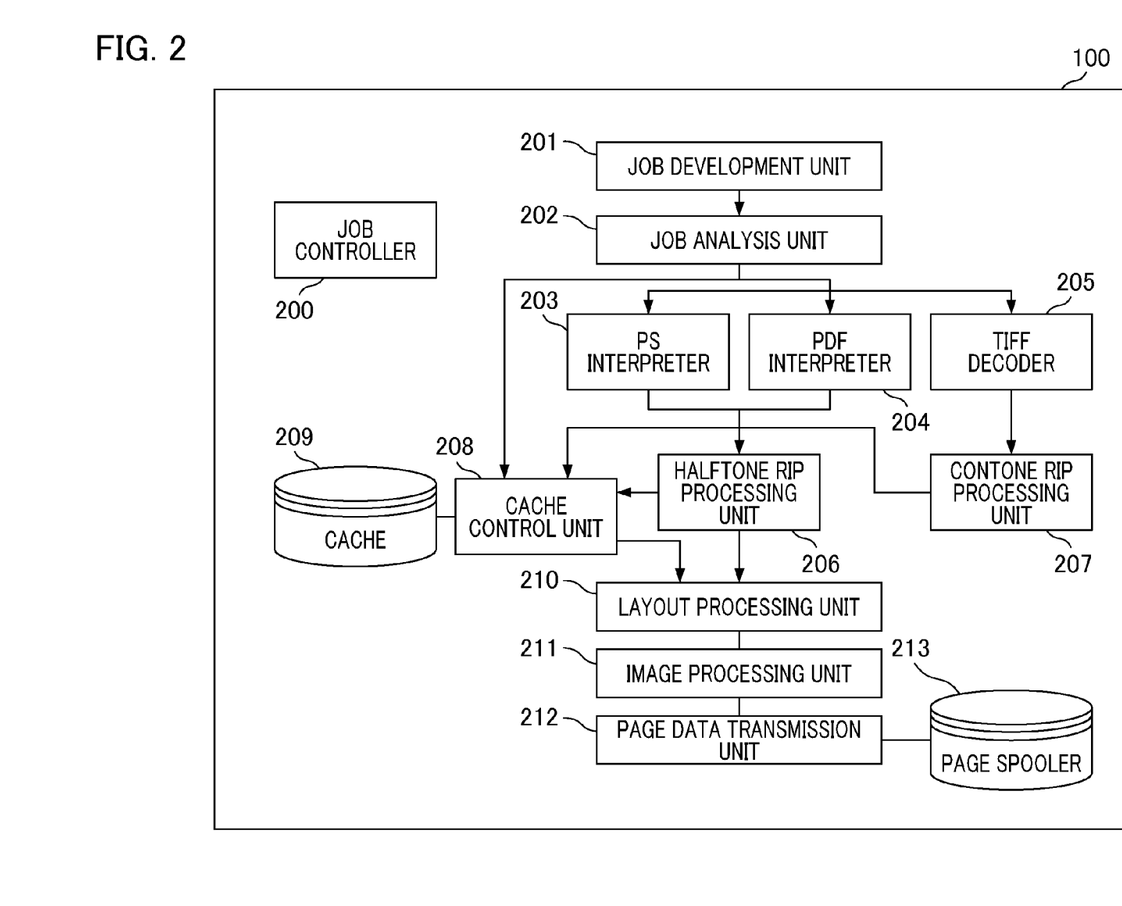
FIG. 2 is an exemplary functional block diagram illustrating a print device.

FIG. 2 is an exemplary functional block diagram illustrating a print device. The print device 100 includes a job controller 200, a job development unit 201, a job analysis unit 202, a PS interpreter 203, a PDF interpreter 204, and a TIFF decoder 205. The print device 100 further includes a halftone RIP processing unit 206, a contone RIP processing unit 207, a cache control unit 208, a cache 209, a layout processing unit 210, an image processing unit 211, a page data transmission unit 212, and a page spooler 213. A computer program for implementing the processing units is developed by the RAM 103 and is executed by the CPU 101. The computer program implements a method for controlling the image forming apparatus of the present embodiment.

The job controller 200 controls the processing units. The job development unit 201 receives a print job via the network I/F 102. In this example, the job controller 200 receives a Variable Data Printing job (VDP job). The job development unit 201 develops the received VDP job. The job analysis unit 202 analyzes a VDP job, and extracts a variable object, a fixed object, and template data from the VDP job. The variable object and the fixed object are to be subjected to layout processing by the layout processing unit 210. The job controller 200 functions as a first determination unit configured to determine whether or not the extracted object is a reusable object based on the result of analysis of the VDP job by the job analysis unit 202.

The PS interpreter 203 and the PDF interpreter 204 develop the extracted object, generate an intermediate data format, and transmit the generated intermediate data format to the halftone RIP processing unit 206. The halftone RIP processing unit 206 performs halftone RIP processing for the received intermediate data format to thereby generate a halftone image (binary image data).

The TIFF decoder 205 develops the extracted object, generates an intermediate data format, and transmits the generated intermediate data format to the contone RIP processing unit 207. The contone RIP processing unit 207 performs RIP processing for the intermediate data format received from the TIFF decoder 205 and coverts it into an image. More specifically, the contone RIP processing unit 207 generates a contone image (multinary image data).

The cache control unit 208 manages/controls the cache 209. The cache control unit 208 functions as a storage unit configured to receive an image from both the halftone RIP processing unit 206 and the contone RIP processing unit 207 and store the image in the cache 209. Also, the cache control unit 208 searches the cache 209 in accordance with the instruction given by the job controller 200 and passes an object obtained by the search to the layout processing unit 210. The cache 209 is a storage unit configured to be installed on the RAM 103 or the HDD 104.

The layout processing unit 210 lays out variable data and fixed data on a page based on template data analyzed by the job analysis unit 202 (generates page data). The image processing unit 211 executes image processing such as calibration, color conversion, or the like for page data generated by the layout processing unit 210.

The page data transmission unit 212 stores page data output by the image processing unit 211 in the page spooler 213 in accordance with the instructions given by the job controller 200. Also, the page data transmission unit 212 transmits page data stored in the page spooler 213 to the printer engine 108. The page data transmission unit 212 may transmit page data output by the image processing unit 211 directly to the printer engine 108. The page spooler 213 is a storage unit configured to be installed on the RAM 103 or the HDD 104.

Figure 3:
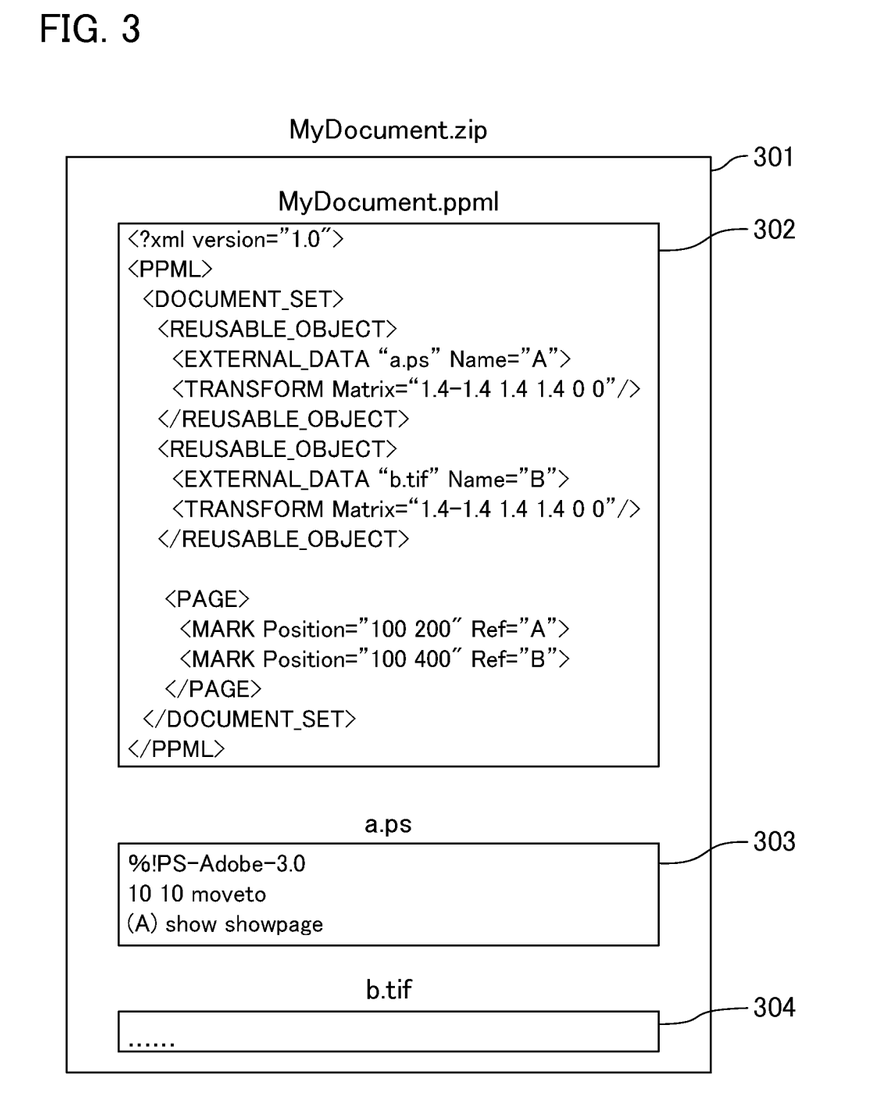
FIG. 3 is a diagram illustrating an example of the configuration of a VDP job to be executed by a print device.

FIG. 3 is a diagram illustrating an example of the configuration of a VDP job to be executed by a print device. FIG. 3 shows an example of the configuration of a VDP job of PPML standard. The VDP job has an archive file 301.

The archive file 301 is, for example, a library including a plurality of files compressed in a ZIP format. In this example, the archive file 301 having the file name "MyDocument.zip" stores a PPML file 302, PS data 303, and TIFF data 304. The PS data 303 and the TIFF data 304 are content files. Since the file format of the TIFF data 304 is binary, the contents of the file are not described in FIG. 3.

One PPML file 302 is surely stored in the archive file 301. In this example, the PPML file 302 has the file name "MyDocument.ppml". The PPML file 302 is template data, and a plurality of pages is defined for each record that is a variable unit in a VDP job. For example, when the contents of a VDP job vary for each customer, each customer is defined as one record. When print data that includes variable data of 10 pages for each of fifty customers is printed out, a definition is made such that a job has 50 records and variable data is data of 10 pages for each record.

In the PPML file 302, content files 303 and 304 are specified as reference files. In this example, the content files 303 and 304 are referred by the file names "a.ps" and "b.tif", respectively. An attribute indicating either a variable object or a reusable object is attached to the content file being referred. In this example, both the content files 303 and 304 are specified as a reusable object.

The content file 303 is described by the PostScript language as defined by Adobe Systems Incorporated. The content file 304 is described by TIFF (Tagged Image Format). The content file may be the PDL language such as PDF or may be the general purpose image format such as JPEG (Joint Photographic Experts Group). Also, the content files 303 and 304 include the specification of transformation processing to be executed upon reuse thereof. Transformation processing includes any one of enlargement, reduction, rotation, and movement of an object. In this example, the content files 303 and 304 are intended to include the specification of double enlargement and clockwise rotation by 45 degrees as the specification of transformation processing to be executed upon reuse thereof.

Figure 4:
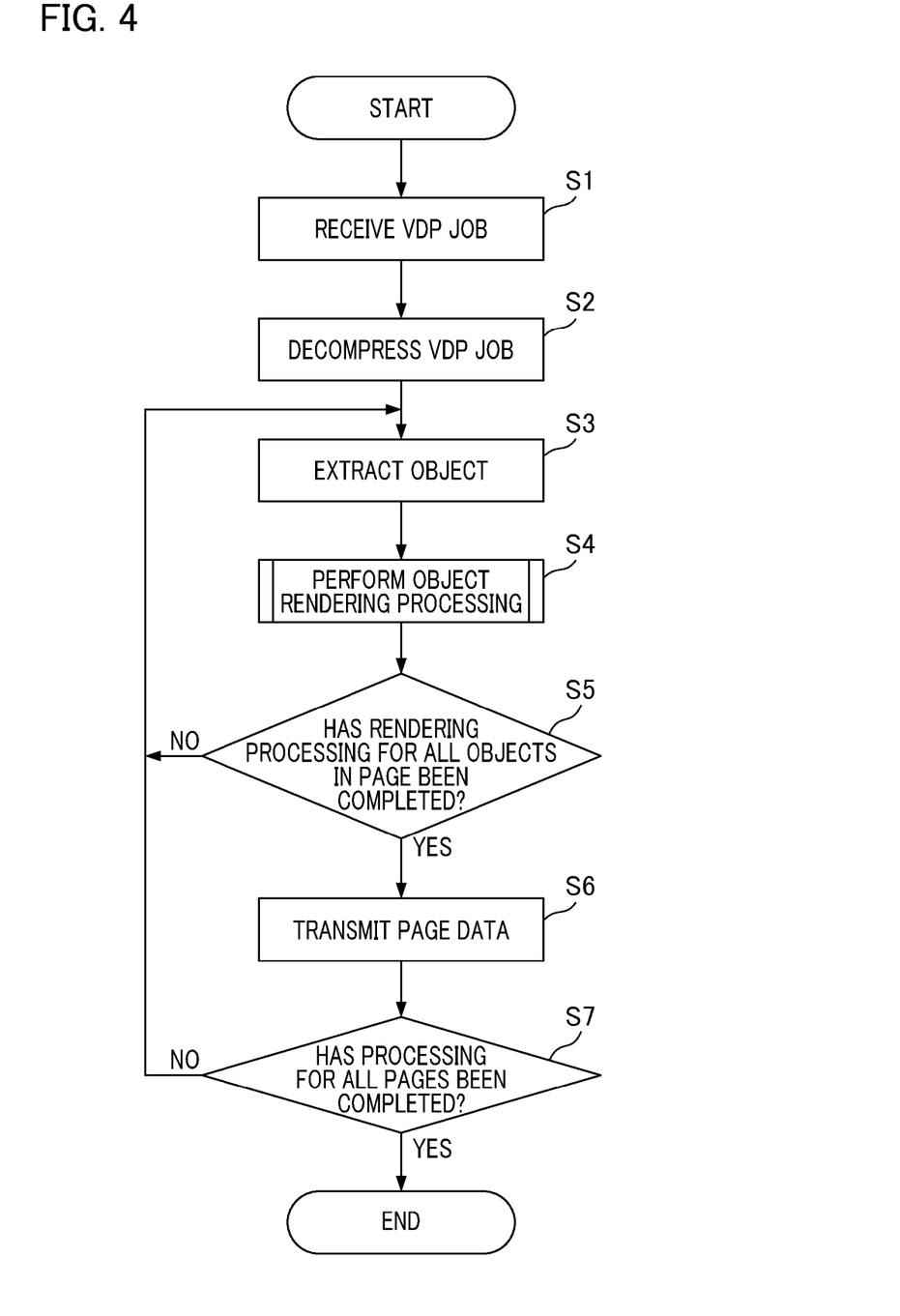
FIG. 4 is a flowchart illustrating an example of operation processing performed by a print device.

FIG. 4 is a flowchart illustrating an example of operation processing performed by a print device. Firstly, the job controller 200 is activated and the job development unit 201 receives a VDP job via the network I/F 102 (step S1). Next, the job development unit 201 develops the received VDP job on the RAM 103 (step S2). Next, the job analysis unit 202 extracts an object from the developed VDP job, and stores the object in the RAM 103 (step S3).

Next, the job controller 200 executes object rendering processing (step S4). More specifically, the job controller 200 renders the extracted object in a page buffer (generates page data). Next, the job controller 200 determines whether or not rendering processing for all objects in a page has been completed (step S5). When rendering processing for all objects in a page has not been completed, the process returns to step S3. When rendering processing for all objects in a page has been completed, the job controller 200 transmits the generated page data to the printer engine 108 via the page data transmission unit 212 (step S6).

Next, the job controller 200 determines whether or not processing for all pages has been completed (step S7). When processing for all pages has not been completed, the process returns to step S3. When processing for all pages has been completed, the processing for a VDP job is ended.

Figure 5:
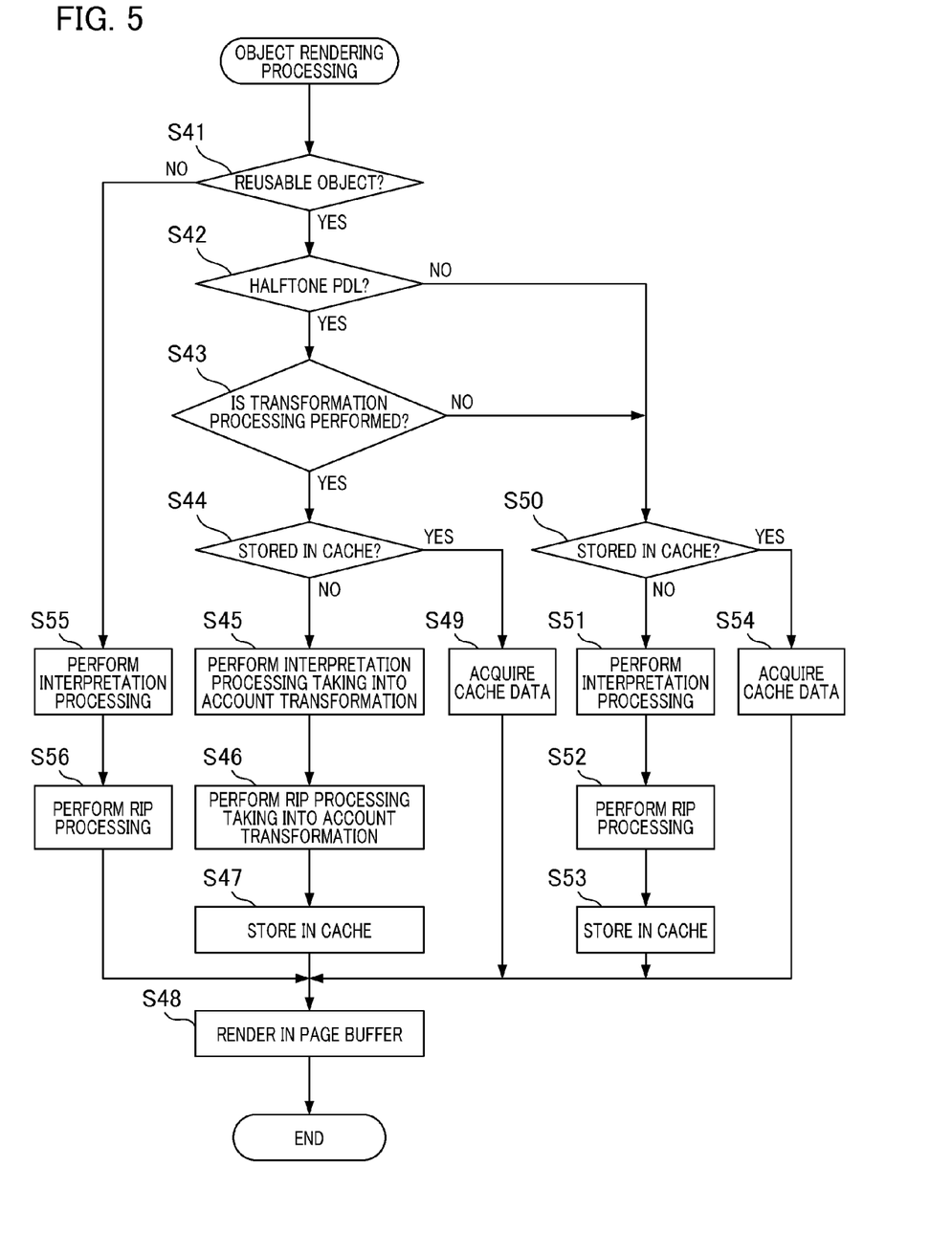
FIG. 5 is a flowchart illustrating the details of object rendering processing.

FIG. 5 is a flowchart illustrating the details of object rendering processing in step S4 shown in FIG. 4. Firstly, the job controller 200 determines whether or not the extracted object is a reusable object based on the result of analysis of the VDP job by the job analysis unit 202 (step S41). When the job controller 200 determines that the object is not a reusable object, the job controller 200 executes object interpretation processing (step S55). In step S55, the job controller 200 interprets the object using an interpretation unit corresponding to the object among the interpretation units of the PS interpreter 203, the PDF interpreter 204, and the TIFF decoder 205.

Next, the job controller 200 generates image data of the object (step S56). For example, when interpretation processing has been executed in step S55 using the PS interpreter 203 or the PDF interpreter 204, the job controller 200 instructs the halftone RIP processing unit 206 to execute halftone RIP processing for the object. When interpretation processing has been executed in step S55 using the TIFF decoder 205, the job controller 200 instructs the contone RIP processing unit 207 to execute contone RIP processing for the object.

After the process in step S56, the job controller 200 renders image data of the object in a page buffer (step S48). More specifically, the layout processing unit 210 arranges image data of the object on a page in accordance with the instructions given by the job controller 200 to thereby generate page data. Then, the image processing unit 211 executes image processing for the generated page data in accordance with the instruction given by the job controller 200.

When the job controller 200 has determined in step S41 that the object is a reusable object, the job controller 200 executes the following processing based on the result of analysis of the VDP job by the job analysis unit 202. The job controller 200 determines whether or not the object is an object to be processed by the halftone RIP processing unit 206 (step S42). In other words, the job controller 200 functions as a second determination unit configured to determine whether or not the object determined to be a reusable object is subjected to halftone processing based on the result of analysis of the VDP job.

Here, an object to be processed by the halftone RIP processing unit 206 is described as "halftone PDL". For example, the job controller 200 determines whether or not the object is any one of PS data, PDF data, and TIFF data. When the object is PS data or PDF data, the job controller 200 determines that the object is a halftone PDL. When the object is TIFF data, the job controller 200 determines that the object is not a halftone PDL.

When the job controller 200 has determined that the object is not a halftone PDL, the process advances to step S50. Then, normal cache control as described below is executed.

First, the job controller 200 queries the cache control unit 208, and determines whether or not image data of the object has already been stored in the cache 209 based on the query result (step S50). When image data of the object has already been stored in the cache 209, the job controller 200 acquires image data of the object (cache data) from the cache 209 (step S54). Then, the process advances to step S48, and the job controller 200 renders image data of the object acquired in step S54 in a page buffer.

When image data of the object has not yet been stored in the cache 209, the job controller 200 executes interpretation processing for the object in the same manner as that in step S55 (step S51). Also, the job controller 200 performs the same RIP processing as that in step S56 to thereby generate image data of the object (step S52). Next, the job controller 200 instructs the cache control unit 208 to store the generated image data in the cache 209 (step S53). Also, the job controller 200 renders the generated image data in a page buffer (step S48).

When the job controller 200 has determined in step S42 that the object (reusable object) is a halftone PDL, the process advances to step S43. Then, the job controller 200 queries the job analysis unit 202, and determines whether or not transformation processing is performed upon reuse of the reusable object based on the query result (step S43). In other words, the job controller 200 functions as a third determination unit configured to execute the following processing. The job controller 200 determines whether or not image data of the reusable object stored in the cache 209 is subjected to transformation processing upon reuse of image data for page layout processing based on the result of analysis of the VDP job by the job analysis unit 202. The transformation processing is, for example, enlargement, reduction, rotation, or movement of an object. In step S43, the job analysis unit 202 queried from the job controller 200 analyzes a content file included in the VDP job, and notifies the job controller 200 of the fact that the specification of transformation processing is made in the content file. When the specification of transformation processing is made in the content file, the job analysis unit 202 also notifies the job controller 200 about the content of the transformation processing.

When the job controller 200 has determined that the reusable object is not subjected to transformation processing upon reuse thereof, the process advances to step S50. When the job controller 200 has determined that the reusable object is subjected to transformation processing upon reuse thereof, the job controller 200 queries the cache control unit 208. Then, the job controller 200 determines whether or not image data of the reusable object has already been stored in the cache 209 based on the query result (step S44).

When image data of the reusable object has already been stored in the cache 209, the job controller 200 acquires image data of the reusable object (cache data) from the cache 209 (step S49). Then, the process advances to step S48, and the job controller 200 performs transformation processing for image data of the reusable object acquired in step S49 and renders the transformed image data in a page buffer.

When image data of the reusable object has not yet been stored in the cache 209, the job controller 200 performs interpretation processing (step S45) and RIP processing for the reusable object by taking into account transformation (step S46). More specifically, in step S46, the job controller 200 functions as an image data generation unit, and executes the following processing for the reusable object by instructing the halftone RIP processing unit 206. The job controller 200 executes halftone RIP processing, which includes the process of reversing the transformation indicated by the transformation processing reported by the job analysis unit 202, for the reusable object to thereby generate image data (halftone image). More specifically, the job controller 200 generates image data on which halftone processing has been executed in a halftone shape taking into account transformation.

For example, the halftone RIP processing unit 206 generates a halftone image having a halftone shape obtained as a result of subjecting the process of reversing the transformation indicated by the transformation processing to a halftone shape preset as a halftone shape obtained by the print result. More specifically, in the case of a character in which a 30 degree rotation instruction is included, the character is subjected to RIP processing and caching using a halftone shape rotated by −30 degrees relative to the normal halftone shape. Although the halftone shape is offset by −30 degrees at the time of caching, cache data is rotated by 30 degrees at the time of usage. Consequently, the halftone shape is returned to the normal halftone shape, and thus, image failure can be prevented. Then, the job controller 200 instructs the cache control unit 208 to store the generated image data in the cache 209 (step S47). Also, the job controller 200 renders the generated image data in a page buffer (step S48). During rendering processing, the job controller 200 renders image data subjected to transformation processing in a page buffer.

The job controller 200 may perform the inverse transformation processing against transformation processing reported by the job analysis unit 202 for image data of the object and execute halftone processing for image data subjected to the inverse transformation processing to store the resulting image data in the cache 209.

As described with reference to FIG. 5, the job controller 200 functions as a first discrimination unit configured to discriminate whether or not image data of an object to be subjected to transformation processing is stored in a storage unit (step S44). Also, the job controller 200 functions as a first acquisition unit configured to execute the following processing. In other words, when it is discriminated that image data of an object to be subjected to transformation processing is not stored in a storage unit (NO in step S44), the job controller 200 generates image data on which halftone processing taking into account transformation has been executed (steps S45 and S46). Also, the job controller 200 stores the generated image data in a storage unit (step S47). When it is discriminated that image data of an object to be subjected to transformation processing is stored in a storage unit (YES in step S44), the job controller 200 acquires image data stored in the storage unit (step S49).

The job controller 200 functions as a second discrimination unit configured to discriminate whether or not image data of an object not to be subjected to transformation processing is stored in a storage unit (step S50). Also, the job controller 200 functions as a second acquisition unit configured to execute the following processing. Specifically, when it is discriminated that image data of an object not to be subjected to transformation processing is not stored in a storage unit (NO in step S50), the job controller 200 generates image data on which halftone processing has been executed (steps S51 and S52). Then, the job controller 200 stores the generated image data in a storage unit (step S53). When it is discriminated that image data of an object not to be subjected to transformation processing is stored in a storage unit (YES in step S50), the job controller 200 acquires image data stored in the storage unit (step S54). The job controller 200 also functions as a rendering unit configured to perform transformation processing for the acquired image data and to render the resulting image data in a buffer (step S48).

Figure 6A:
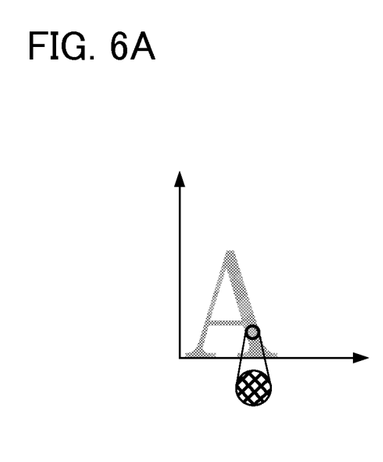
FIGS. 6A to 6D are diagrams illustrating the effect of rendering processing for image data of an object to be executed by the image forming apparatus of the present embodiment.
Figure 6B:
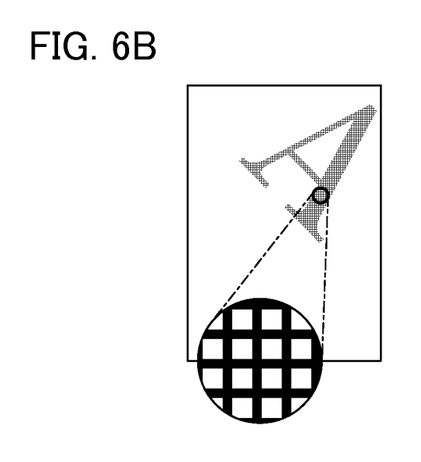

FIGS. 6A to 6D are diagrams illustrating the effect of rendering processing for image data of an object to be executed by the image forming apparatus of the present embodiment. FIG. 6A shows image data (cache data) obtained as a result of halftone processing for an object without taking into account the transformation upon reuse of the object. FIG. 6B shows an exemplary print result obtained when printing is performed after the cache data shown in FIG. 6A was subjected to transformation processing, i.e., double enlargement and the clockwise rotation by 45 degrees.

The cache data shown in FIG. 6A has a circular halftone shape at an angle of 45 degrees. However, when the job controller 200 performs rendering processing by the utilization of cache data, cache data is subjected to transformation processing, i.e., double enlargement and the clockwise rotation by 45 degrees. As shown in FIG. 6B, the halftone shape and its angle are subjected to transformation. Consequently, the halftone shape and its angle in the print result obtained by the utilization of cache data become inappropriate values, resulting in the occurrence of image failure.

In contrast, the image forming apparatus of the present embodiment executes interpretation processing and RIP processing taking into account transformation processing (steps S45 and S46 shown in FIG. 5). More specifically, the job controller 200 acquires the content of transformation processing set to the object from the job analysis unit 202. The job controller 200 instructs the PS interpreter 203 or the PDF interpreter 204 serving as an interpretation unit and the halftone RIP processing unit 206 to perform the process of reversing the transformation indicated by the transformation processing. The process of reversing the transformation, i.e., double enlargement and the clockwise rotation by 45 degrees is the transformation, i.e., half-size reduction and the counter-clockwise rotation by 45 degrees. As a result of the inverse transformation, cache data as shown in FIG. 6C is generated.

Figure 6C:
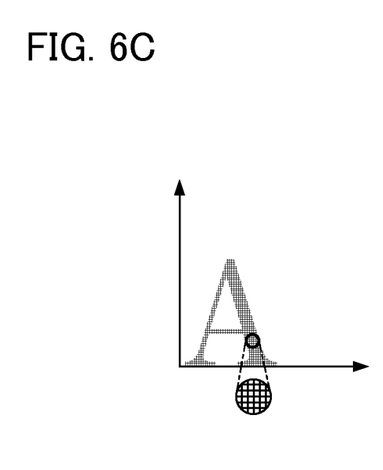

The halftone of cache data shown in FIG. 6C has a finer shape than a desired shape. However, since the halftone of cache data is subjected to transformation, i.e., double enlargement and the clockwise rotation by 45 degrees, upon reuse thereof, a desired halftone shape and its angle are obtained as the print result shown in FIG. 6D.

Figure 6D:
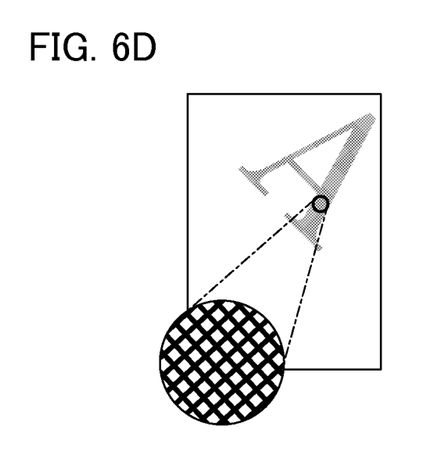

In the present embodiment of the present invention, the job controller 200 performs RIP processing for a character in a halftone shape by taking into account the transformation in step S46 shown in FIG. 5 (FIG. 6C). However, the job controller 200 may perform RIP processing for the transformed character, and then perform halftone processing for image data of the transformed character subjected to RIP processing in a normal halftone shape in step S46 (FIG. 6D). Then, the job controller 200 may cache the transformed image data processed in a normal halftone shape in step S47 shown in FIG. 5. Also, in step S48, the job controller 200 may render the cached image data of a character subjected to transformation and halftone processing in a page buffer.

According to the image forming apparatus of the present embodiment, the occurrence of image failure will not be generated even when image data is subjected to transformation processing upon reused of image data of a reusable object.

Next, a description will be given of an image forming apparatus according to another embodiment. The image forming apparatus according to another embodiment executes interpretation processing and RIP processing taking into account transformation only when a predetermined condition is satisfied.

Figure 7:
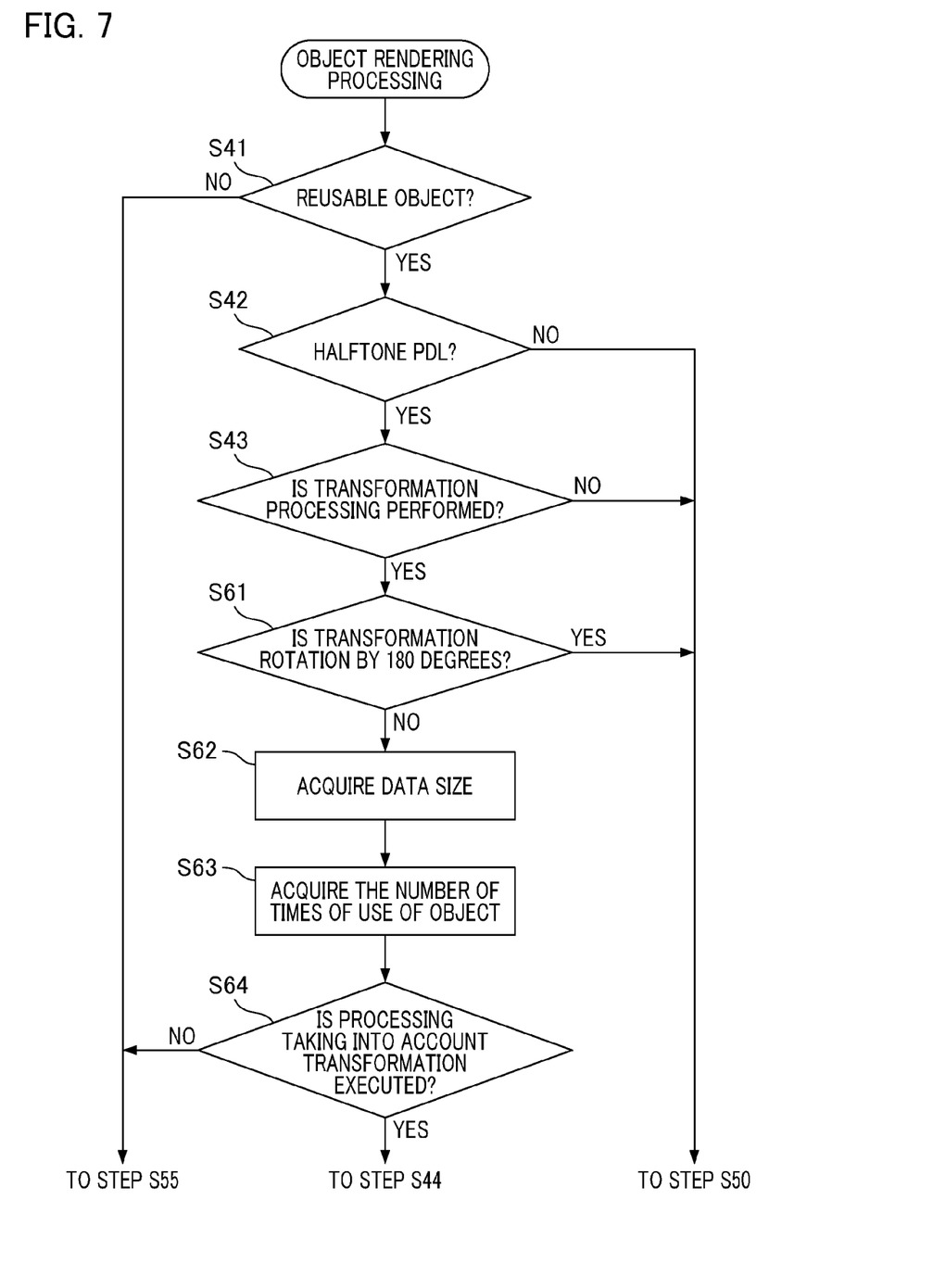
FIG. 7 is a flowchart illustrating an example of object rendering processing according to another embodiment.

FIG. 7 is a flowchart illustrating an example of object rendering processing according to another embodiment. Object rendering processing in accordance with the flowchart shown in FIG. 7 is different from object rendering processing in accordance with the flowchart shown in FIG. 5 in that processing in steps S61 to S64 shown in FIG. 7 is executed. Processing other than processing in steps S61 to S64 is the same as object rendering processing in accordance with the flowchart shown in FIG. 7.

In step S61, the job controller 200 queries the job analysis unit 202, and determines whether or not the transformation designated for the reusable object is only rotation by 180 degrees based on the query result (step S61). When the job controller 200 has determined that the transformation designated for the reusable object is only rotation by 180 degrees, the process advances to step S50 shown in FIG. 5. In this manner, normal cache processing is performed. In other words, when the job controller 200 has determined that transformation processing is the rotation of image data by 180 degrees by determining whether or not transformation processing is the rotation of image data by 180 degrees, the job controller 200 does not execute processing for the process of reversing the transformation indicated by transformation processing. The reason why normal cache processing is performed when transformation only involves rotation by 180 degrees is that the halftone shape and its angle do not change upon reuse of image data, and thus, image failure does not occur when transformation only involves rotation by 180 degrees.

When the job controller 200 has determined that the transformation designated for the reusable object is not only rotation by 180 degrees, the process advances to step S52. The job controller 200 queries the job analysis unit 202 to thereby acquire the data size of the reusable object (step S62).

Next, the job controller 200 queries the job analysis unit 202, and acquires the number of times of use of the reusable object in a VDP job (the number of times of use) (step S63). Next, the job controller 200 determines whether or not interpretation processing and RIP processing taking into account transformation are executed (step S64). In step S64, the job controller 200 determines whether or not interpretation processing and RIP processing taking into account transformation are executed based on the data size acquired in step S62, the number of times of use acquired in step S63, and reference information about the number of times of use.

Reference information about the number of times of use is correspondence information between the data size of the reusable object determined to be subjected to halftone processing and the reference value for the number of times of use of the reusable object in a VDP job. Reference information about the number of times of use is stored in a storage unit in advance.

Figure 8A:
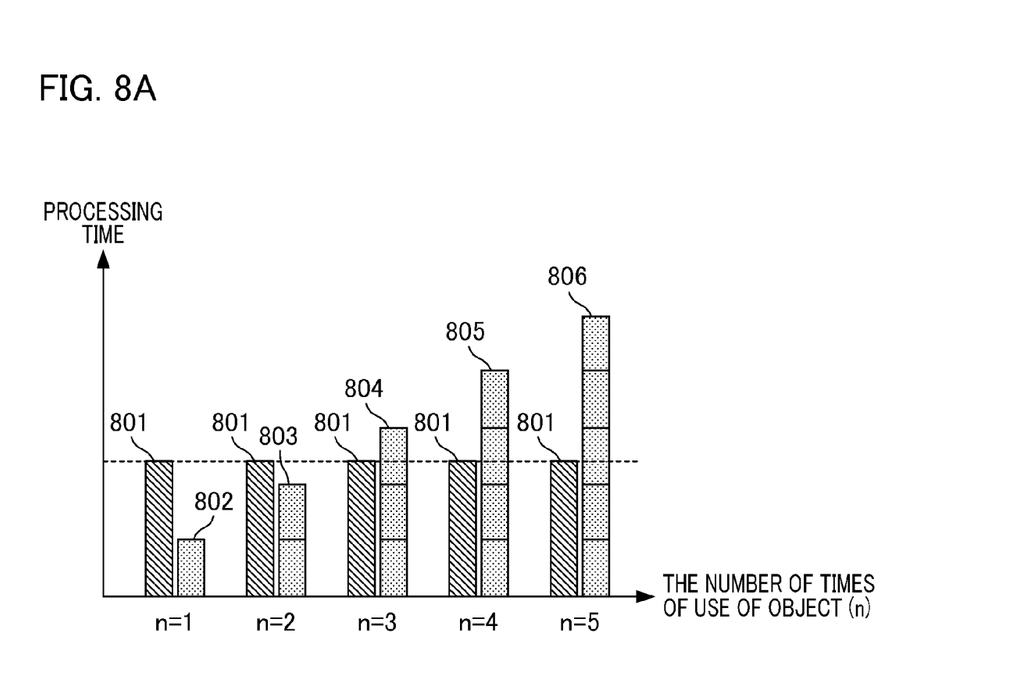
FIG. 8A is a diagram illustrating the relationship between the number of times of use of an object and a processing time.
Figure 8B:
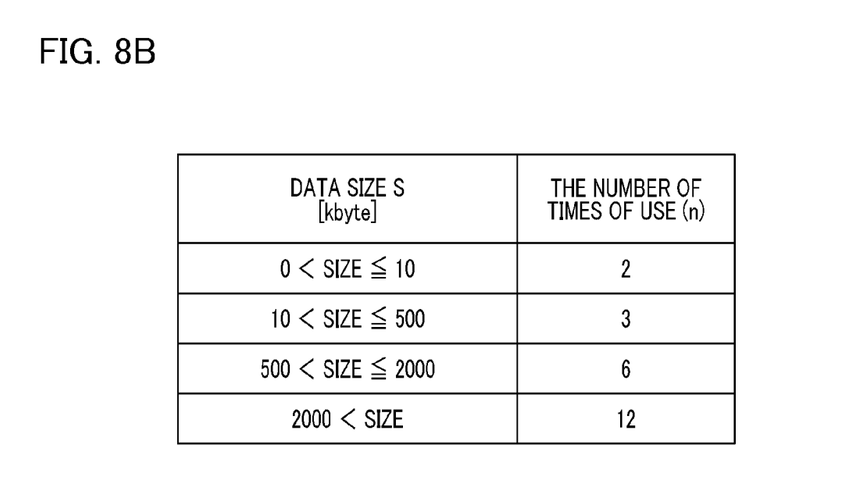
FIG. 8B is a diagram illustrating an example of reference information about the number of times of use.

FIGS. 8A and 8B are diagrams illustrating processing for determining whether or not processing taking into account transformation is executed in step S64 shown in FIG. 7. FIG. 8A is a diagram illustrating the relationship between the number of times of use of an object and a processing time, where a vertical axis represents a processing time and a horizontal axis represents the number of times of use of an object.

A graph 801 shown in FIG. 8A illustrates a processing time taken when the job controller 200 executes interpretation processing and RIP processing taking into account transformation. In this case, image data stored in the cache 209 is used in the processing subsequent to step S44 shown in FIG. 5, and thus, a processing time does not increase even when the number of times of use of an object is two or more (n=2 or more).

On the other hand, each of graphs 802 to 806 illustrates a processing time taken when the job controller 200 executes normal object processing (the processing subsequent to step S55 shown in FIG. 5). In this case, processing taking into account the transformation of an object is not performed, and thus, the processing time 802 taken for one object is shorter than the processing time (the processing time 801) taken when processing taking into account transformation is performed. However, during normal object processing, image data stored in the cache 209 is not used, and thus, a processing time increases with increasing the number of times of use of an object as shown in the graphs 802 to 806.

More specifically, a processing time taken when the number of times of use is up to two is shorter than the processing time shown by the graph 801, whereas a processing time taken when the number of times of use is three or more becomes longer than the processing time shown by the graph 801. In other words, it can be seen that processing taking into account transformation is preferably applied to only an object for which the number of times of use "n" is three or more. The number of times of use of an object, which is a reference value for determining whether or not processing taking into account transformation should be applied, is described as "N". In the present embodiment, the number "N" represents a reference value for the number of times of use of the reusable object in the VDP job. The value of "N" depends on the data size of an object.

FIG. 8B is a diagram illustrating an example of reference information about the number of times of use. Reference information about the number of times of use has data items such as the data size (S) and the number of times of use (N). The data size (S) represents the data size of a reusable object. The number of times of use (N) represents a reference value for the number of times of use of the reusable object in the VDP job. The number of times of use (N) is preset to the number of times of use of a reusable object such that a processing time taken when processing taking into account transformation is performed becomes shorter than a processing time taken when processing not taking into account transformation is performed.

In FIG. 8B, the number "N" corresponding to the data size of 10 kilobytes or below is two. The number "N" corresponding to the data size of greater than 10 kilobytes but equal to or below 500 kilobytes is three. The number "N" corresponding to the data size of greater than 500 kilobytes but equal to or below 2000 kilobytes is six. The number "N" corresponding to the data size of greater than 2000 kilobytes is twelve.

During determination processing in step S64 shown in FIG. 7, the job controller 200 executes the following processing. Among the entries (data in one row) of reference information about the number of times of use shown in FIG. 8B, the job controller 200 selects an entry corresponding to the data size (S) such that the data size acquired in step S62 shown in FIG. 7 falls within the range of the data size (S). The job controller 200 acquires the number of times of use (N) included in the selected entry. Then, the job controller 200 determines whether or not the number of times of use acquired in step S63 shown in FIG. 7 is equal to or greater than the acquired number of times of use (N), i.e., a reference value. When the number of times of use is equal to the number of times of use (N), the job controller 200 determines that interpretation processing and RIP processing taking into account transformation are executed. Then, the process advances to step S44 shown in FIG. 5.

When the number of times of use is not equal to the number of times of use (N), the job controller 200 determines that interpretation processing and RIP processing taking into account transformation are not executed. Then, the process advances to step S55 shown in FIG. 5. According to the processing described with reference to FIGS. 7 and 8, a processing time may be reduced depending on the data size of the reusable object and the number of times of use thereof.

According to the aforementioned image forming apparatus of the present embodiment, the occurrence of image failure may be prevented even when transformation processing for image data subjected to halftone processing (for example, image data of the reusable object) upon reuse thereof.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-091735 filed Apr. 18, 2011, which is hereby incorporated by reference herein in its entirety.

What is claimed is:

1. An image forming apparatus comprising:
   a first discrimination unit configured to discriminate whether or not image data of an object to be subjected to transformation processing is stored in a storage unit;
   a first acquisition unit configured to generate image data on which halftone processing, taking into account transformation, has been executed and store the generated image data in the storage unit in a case where the first discrimination unit has discriminated that image data of the object to be subjected to transformation processing is not stored in the storage unit, and acquire image data stored in the storage unit in a case where the first discrimination unit has discriminated that image data of the object to be subjected to transformation processing is stored in the storage unit;
   a second discrimination unit configured to discriminate whether or not image data of an object not to be subjected to transformation processing is stored in a storage unit; and
   a second acquisition unit configured to generate image data on which halftone processing has been executed and store the generated image data in the storage unit in a case where the second discrimination unit has discriminated that image data of the object not to be subjected to transformation processing is not stored in the storage unit, and acquire image data stored in the storage unit in a case where the second discrimination unit has discriminated that image data of the object not to be subjected to transformation processing is stored in the storage unit.

2. The image forming apparatus according to claim 1, further comprising:
   a rendering unit configured to subject image data acquired by the first acquisition unit to the transformation processing and to render the image data in a buffer.

3. An image forming apparatus, comprising:
   a discrimination unit configured to discriminate whether or not image data of an object to be subjected to transformation processing is stored in a storage unit, transformation by the transformation processing including at least one of enlargement and rotation; and
   an acquisition unit configured to subject the process of reversing the transformation processing of the image data to a predetermined halftone shape and generate image data on which halftone processing has been executed using the transformed halftone shape and store the generated image data in the storage unit in a case where the discrimination unit has discriminated that image data of the object to be subjected to transformation processing is not stored in the storage unit, and acquire image data stored in the storage unit in a case where the discrimination unit has discriminated that image data of the object to be subjected to transformation processing is stored in the storage unit.

4. An image forming apparatus, comprising:
   a discrimination unit configured to discriminate whether or not image data of an object to be subjected to transformation processing is stored in a storage unit, transformation by the transformation processing including at least one of enlargement and rotation; and
   an acquisition unit configured to execute halftone processing using a predetermined halftone shape for image data of the object having been subjected to the transformation processing and store the image data having been subjected to the halftone processing in the storage unit in a case where the discrimination unit has discriminated that image data of the object to be subjected to transformation processing is not stored in the storage unit, and acquire image data stored in the storage unit in a case where the discrimination unit has discriminated that image data of the object to be subjected to transformation processing is stored in the storage unit.

5. An image forming apparatus, comprising:
   a job analysis unit configured to analyze a print job including an object to be subjected to page layout processing and extract the object from the print job;
   a first determination unit configured to determine whether or not the extracted object is a reusable object based on the result of analysis of the print job;
   a second determination unit configured to determine whether or not the object determined to be the reusable object is subjected to halftone processing based on the result of analysis of the print job;
   a third determination unit configured to determine whether or not image data of a reusable object stored in a cache is subjected to transformation processing upon reuse of the image data for the page layout processing based on the result of analysis of the print job;
   an image data generation unit configured to execute halftone processing, which includes the process of reversing the transformation indicated by the transformation processing, for the reusable object determined to be subjected to the halftone processing by the second determination unit, and to generate image data of the object in a case where the third determination unit has determined that image data of the reusable object stored in the cache is subjected to transformation processing upon reuse of the image data for the page layout processing; and
   a storage unit configured to store the generated image data in the cache.

6. The image forming apparatus according to claim 5, wherein the transformation processing includes any one of enlargement, reduction, rotation, and movement of an object.

7. The image forming apparatus according to claim 5, wherein the image data generation unit determines whether or not the transformation processing is a 180 degree rotation of image data, and does not execute inverse transformation processing for the transformation indicated by the transformation processing in a case where the image data generation unit has determined that the transformation processing is a 180 degree rotation of image data.

8. The image forming apparatus according to claim 5, further comprising:
   a storage unit storing in advance correspondence information between the data size of a reusable object determined to be subjected to the halftone processing and the reference value for the number of times of use of the reusable object in the print job,
   wherein the image data generation unit acquires the data size of a reusable object determined to be subjected to the halftone processing and the number of times of use of the reusable object in the print job based on the result of analysis of the print job, acquires the reference value corresponding to the data size by referring to the correspondence information in the storage unit, and executes halftone processing, which includes the process of reversing the transformation indicated by the transformation processing, in a case where the number of times of use of the acquired reusable object in the print job is equal to or greater than the acquired reference value.

9. A method for controlling an image forming apparatus, comprising:

analyzing, in a job analysis step, a print job including an object to be subjected to page layout processing and extracting the object from the print job;

determining, in a first determination step, whether or not the extracted object is a reusable object based on the result of analysis of the print job;

determining, in a second determination step, whether or not the object determined to be the reusable object is subjected to halftone processing based on the result of analysis of the print job;

determining, in a third determination step, whether or not image data of a reusable object stored in a cache is subjected to transformation processing upon reuse of the image data for the page layout processing based on the result of analysis of the print job;

executing, in an image data generation step, halftone processing, which includes the process of reversing the transformation indicated by the transformation processing, for the reusable object determined to be subjected to the halftone processing in the second determination step, and generating image data of the object in a case where it has been determined in the third determination step that image data of the reusable object stored in the cache is subjected to transformation processing upon reuse of the image data for the page layout processing; and storing, in a storage step, the generated image data in the cache.

10. A non-transitory computer readable storage medium on which is stored a computer program for making a computer execute a method for controlling an image forming apparatus, the method comprising:

analyzing, in a job analysis step, a print job including an object to be subjected to page layout processing and extracting the object from the print job;

determining, in a first determination step, whether or not the extracted object is a reusable object based on the result of analysis of the print job;

determining, in a second determination step, whether or not the object determined to be the reusable object is subjected to halftone processing based on the result of analysis of the print job;

determining, in a third determination step, whether or not image data of a reusable object stored in a cache is subjected to transformation processing upon reuse of the image data for the page layout processing based on the result of analysis of the print job;

executing, in an image data generation step, halftone processing, which includes the process of reversing the transformation indicated by the transformation processing, for the reusable object determined to be subjected to the halftone processing in the second determination step, and generating image data of the object in a case where it has been determined in the third determination step that image data of the reusable object stored in the cache is subjected to transformation processing upon reuse of the image data for the page layout processing; and storing, in a storage step, the generated image data in the cache.

* * * * *